United States Patent [19]
Seybold

[11] 3,834,242
[45] Sept. 10, 1974

[54] FLYWHEEL CONVERTING OSCILLATING INTO UNIFORMLY ROTATING MOTION

[76] Inventor: Frederick W. Seybold, 1979 Dogwood Dr., Scotch Plains, N.J. 07076

[22] Filed: Dec. 4, 1972

[21] Appl. No.: 311,745

[52] U.S. Cl. .................................... 74/25, 74/572
[51] Int. Cl. ............................................ F16h 21/16
[58] Field of Search ........ 74/25, 572, 606, 804, 559

[56] References Cited
UNITED STATES PATENTS

| | | | |
|---|---|---|---|
| 577,065 | 2/1897 | Pole | 74/572 |
| 946,253 | 1/1910 | Moore | 74/804 |
| 1,072,797 | 9/1913 | Varcoe | 74/606 |
| 1,210,174 | 12/1916 | Kempter | 74/706 |
| 2,079,254 | 5/1937 | Jones | 74/559 |
| 2,933,940 | 4/1960 | Hallden | 74/572 |
| 3,248,967 | 5/1966 | Lewis | 74/572 |

Primary Examiner—Samuel Scott
Assistant Examiner—Wesley S. Ratliff, Jr.

[57] ABSTRACT

This invention provides a multiple cylinder-piston engine having the cylinders arranged in a rectangle and paired pistons reciprocate an elongated rocker arm.

A hollow flywheel is journalled on the engine frame and it is provided with an eccentrically mounted crank arm, pin and gear, the latter meshing with a gear of equal size which is integral with said rocker arm, said arm and gear are rotatably mounted on a stationary shaft which is co-axial with the flywheel.

This stationary shaft has one end supported on the engine frame and the other end on the flywheel. A crank arm and pin is also integral with the stationary shaft and a link connects the crank pins of both crank arms, said crank arms are also provided with gear segments to insure passage thru the dead center positions of the crossed four-bar linkage formed by said link, the flywheel and the two crank arms.

6 Claims, 14 Drawing Figures

| CYLINDERS AND STROKE | | | | REVOLUTION |
|---|---|---|---|---|
| A | B | C | D | |
| POWER | EXHAUST | INTAKE | COMPRESSION | ½ REV. |
| EXHAUST | INTAKE | COMPRESSION | POWER | ½ REV. |
| INTAKE | COMPRESSION | POWER | EXHAUST | ½ REV. |
| COMPRESSION | POWER | EXHAUST | INTAKE | ½ REV. |

FIRING ORDER — A-D-C-B      2 REV.

FLYWHEEL CONVERTING OSCILLATING INTO UNIFORMLY ROTATING MOTION

This invention pertains to a novel arrangement of the cylinders of an internal combustion engine which operates according to the well know OTTO CYCLE. The cylinders are positioned in a rectangle rather than in line, whereby a shorter engine is obtained and thereby space becomes available for the installation of emission control devices.

Therefore, it is a primary object of this invention to convert the oscillating motion of a rocker arm by means of planetary gearing and a crossed four-bar linkage within the flywheel of the engine, and impart thereto to the flywheel a uniform rotary motion.

A further object of this invention is to provide means for the reciprocating pistons to transfer their force or pressure unto a rocker arm rather than unto the customary crankshaft.

A still further object of this invention is the elimination of the present crankshaft, whereby weight and cost are reduced.

Another object of this invention is to provide better fuel distribution by the rectangular arrangement of the cylinders.

A still further object of this invention is to provide means to vary the piston clearance in the engine.

The graphs of FIGS. 8, 9, 10 and 11 were drawn by a computer in accordance with Fortran programming at 5° turn of the flywheel.

GENERAL ARRANGEMENT

The structural elements comprise co-axial input and output members, said input member consists of a rocker arm combined with a pinion provided with a long axial bore. Said pinion protrudes into the hollow flywheel or output member. A stationary shaft extends thru this long bore, one end of said shaft fits into a bore of the engine frame, while the other end is journalled in the flywheel.

Eccentrically mounted in the flywheel is a trunnion gear which mates with said pinion. A crank and pin is integral with said trunnion gear and a second crank and pin is secured to the stationary shaft.

A link connects the two crank pins, thereby forming a crossed four-bar linkage which includes the flywheel and the two cranks.

Diametrically opposed gear segments are formed on both cranks to insure passage thru the dead center positions of the linkage.

The rocker arm is actuated by paired pistons of a multiple cylinder engine and the reciprocation of the pistons results in a uniform rotation of the flywheel.

This mechanism must be reversible in order that the engine can be started by turning the flywheel, or the mechanism may be used for operating a pump.

DESCRIPTION OF THE ENGINE AND FLYWHEEL MECHANISM

The cylinder block 10, the valve block 11 and the flywheel compartment 12 form the main structure of the engine and flywheel mechanism. In this compartment a hollow flywheel 13 is rotatably mounted on ball bearings 14 and 15. Supported on ball bearings 16 and 17 is a trunnion gear 18 which has two gear segments 19 and 20 formed on a crank arm 21 integral with the gear 18.

A crank pin 22 is secured in the arm 21. A fixed shaft 23 is supported in a bore 24 on the frame 10 and a ball bearing 25 which is held in the flywheel 13. A crank arm 26 and a crank pin 27 are integral with the stationary shaft 23. Diametrically opposing gear segments 28 and 29 are are formed on the crank arm 26 and these segments mate with the segments 19 and 20.

A link 30 is provided with bushings 31 and 32 and it connects the crank pins 22 and 27. A spur gear 33, having a long hub 34, mates with the trunnion gear 18 and this long hub has external serrations 35 which mate with internal serrations 36 of the rocker arm 37, which is supported on ball bearing 38 and ball bearing 39 on the stationary shaft 23 supports spur gear 33.

A spur gear 45 which is fastened to the flywheel 13 mates with a spur gear 46 which is twice as large as the gear 45 and which is journalled on the cylinder block 10. Compounded with the gear 46 is a smaller gear 47 which mates with the cam shaft gears 48. The valve mechanism, being of standard construction is not a part of this invention.

Figures 1, 1A:
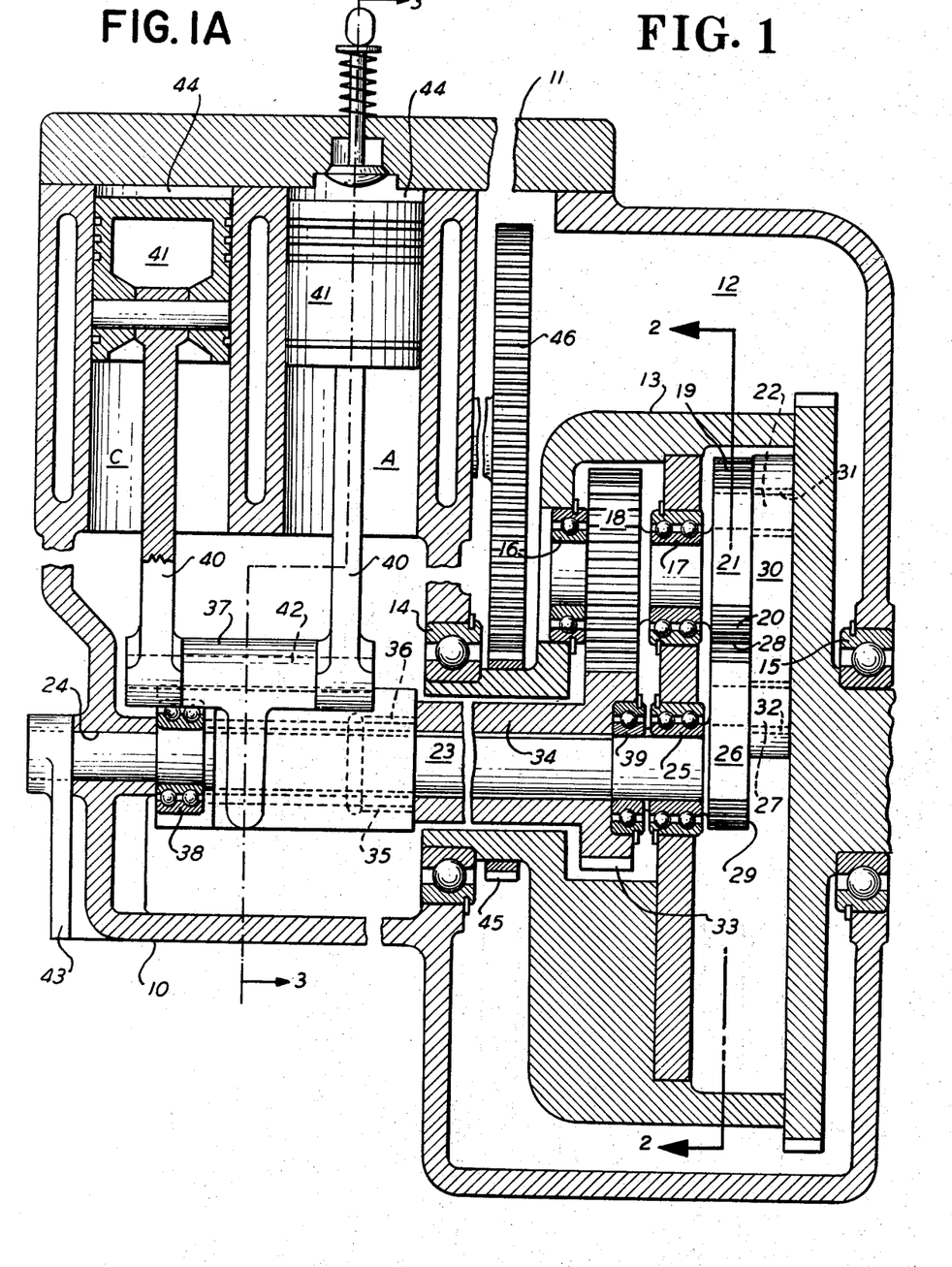
FIG. 1 is a transverse section of a multiple cylinder-piston engine whose driving effort actuates a rocker arm which has integral therewith a spur gear concentrically mounted in a hollow flywheel which is journalled on the engine frame, whereof the engine cylinders are an integral part.
FIG. 1A is a section taken along line 1A—1A of FIG. 4, showing one set of pistons and the associated rocker arm in an uppermost position.
Figure 2:
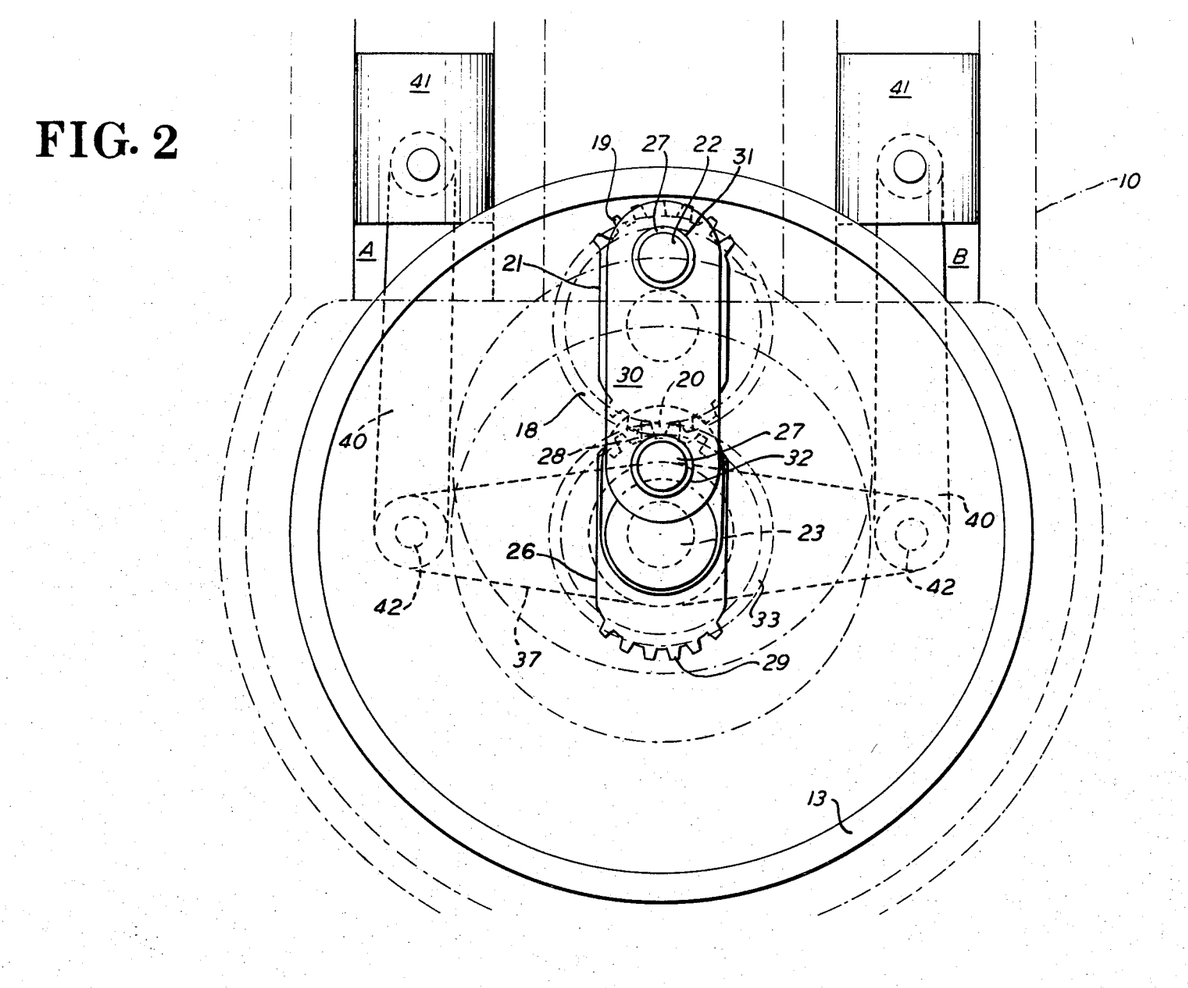
FIG. 2 is an end view of the engine facing the flywheel and with the starter gear removed, taken along line 2—2 of FIG. 1, and showing the rocker arm and connecting rods and pistons in their mid-position.
Figure 3:
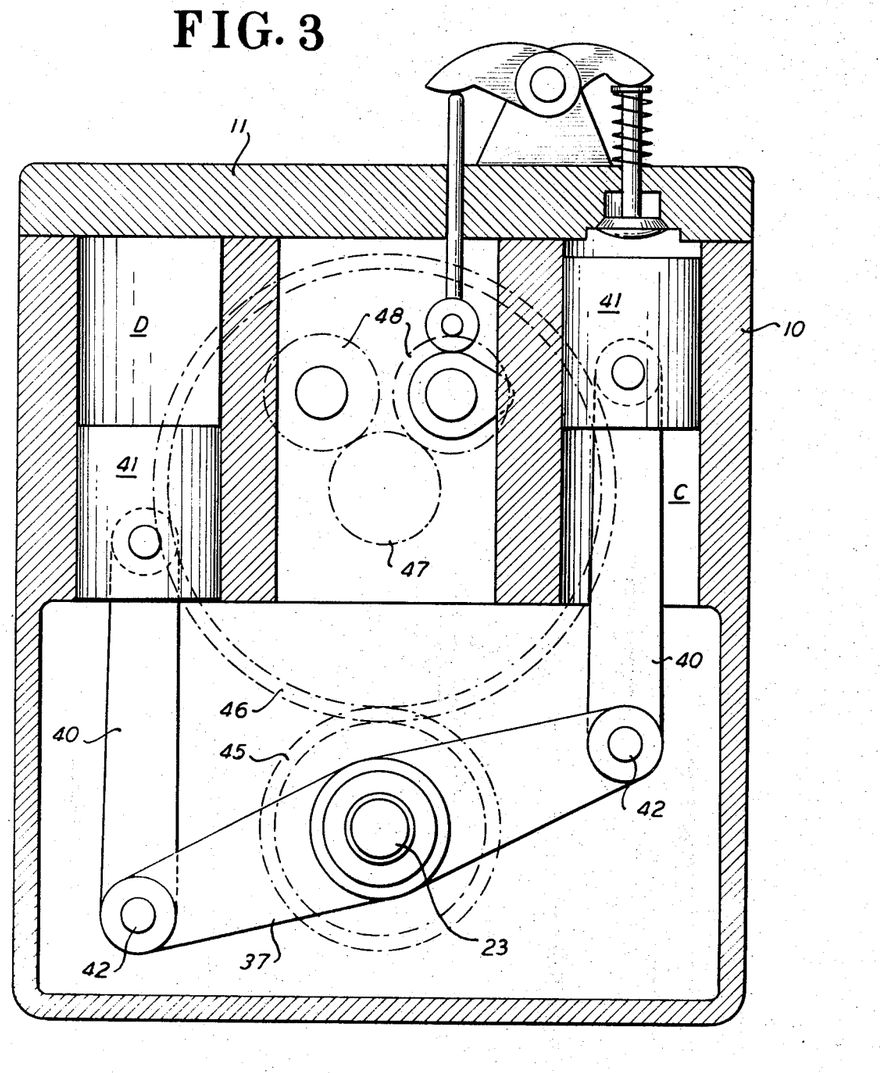
FIG. 3 shows the engine from the opposite end, the rocker arm at the end of its reciprocation in one direction, taken along section 3—3 of FIG. 1.
Figure 4:
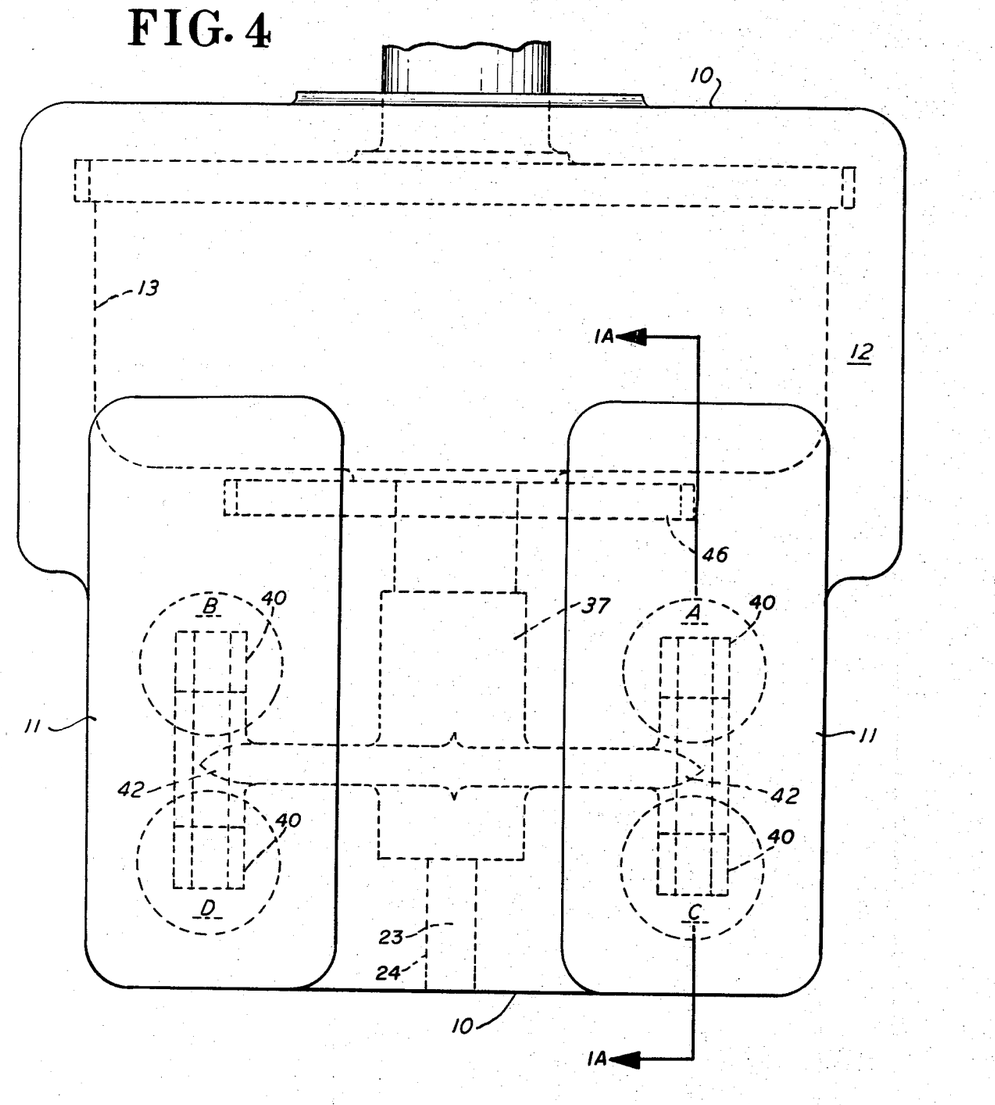
FIG. 4 is a top view of the complete engine showing the relative position of the four pistons in relation to the flywheel.

Cylinders A, B, C, and D are arranged in a rectangle as shown on FIG. 4, and connecting rods 40 join pistons 41 and wrist pins 42 of the rocker arm 37.

An arm 43 is secured to the shaft 23 and this arm is adjustably secured to the frame 10, whereby a small angular movement of the arm 43 will regulate the clearance space or volume 44 of the engine cylinders, making it possible to have equal or unequal clearance spaces on opposed pairs of pistons.

Figure 5:
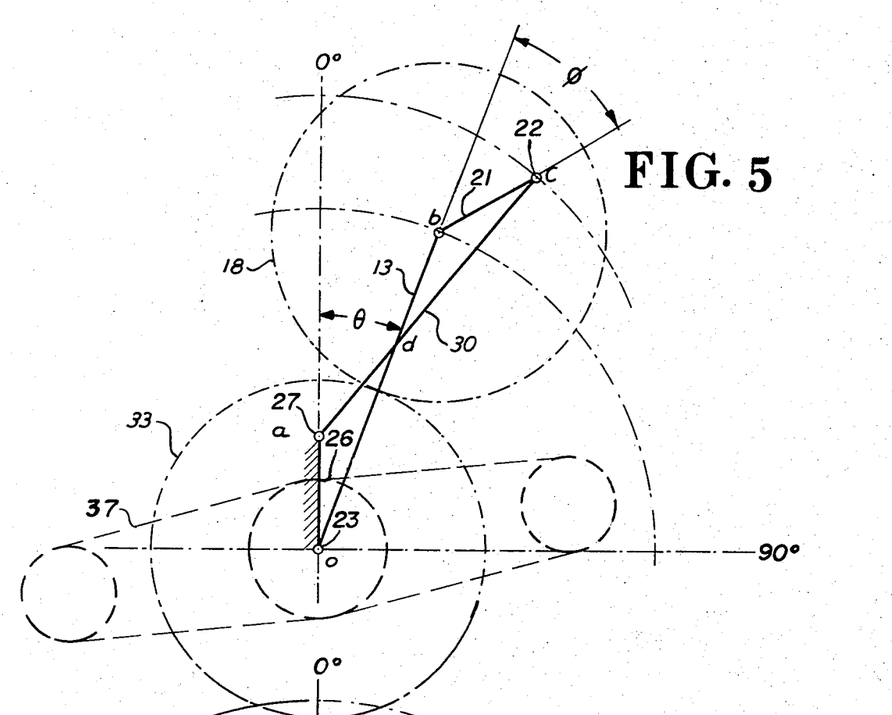
FIG. 5 shows the crossed four-bar linkage kinematically.

In FIG. 5 the stationary member 23 is represented by line $oa$, the flywheel 13 by line $ob$, the crank arm 21 by line $bc$ and the link 30 by line $ac$. The link 30 is intersected at $d$ by the flywheel line $ob$.

The angular velocity of crank 21/The angular velocity of flywheel 13 = $dc/ad$

Figure 6:
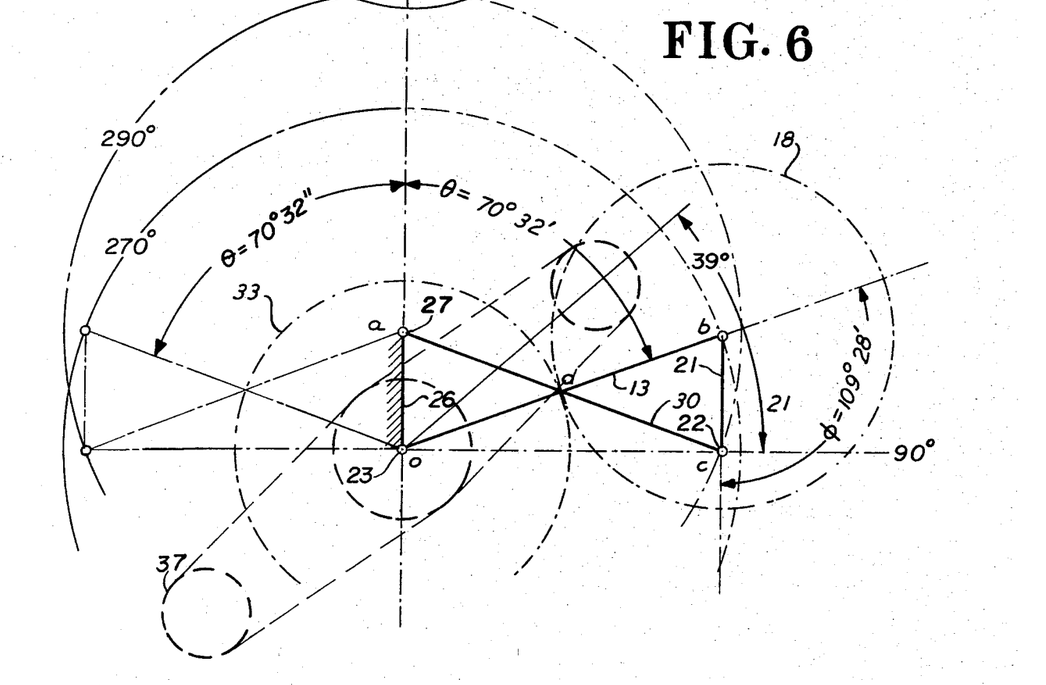
FIG. 6 shows the four-bar linkage in the position where the rocker arm has terminated a stroke and will now reverse its direction of movement.
Figure 7:
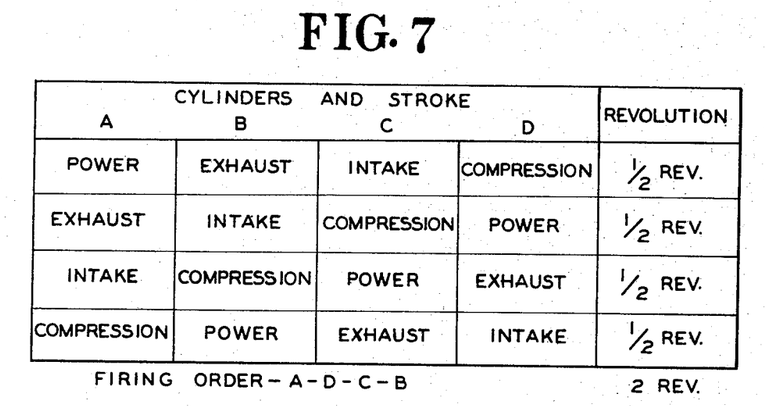
FIG. 7 shows the four-stroke cycle positions of the pistons for two revolutions of the output shaft.
Figure 8:
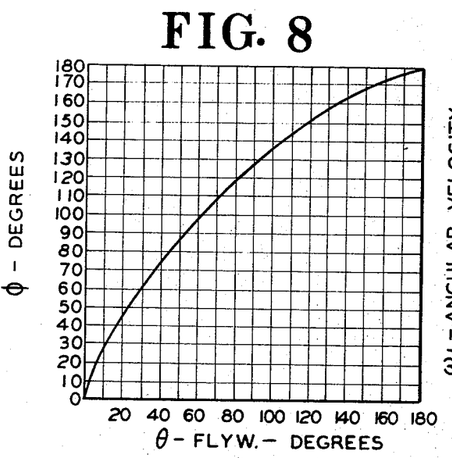
FIG. 8 shows a graph relation between turns of the flywheel and the resultant turn of the eccentrically mounted crank arm in the flywheel.
Figure 9:
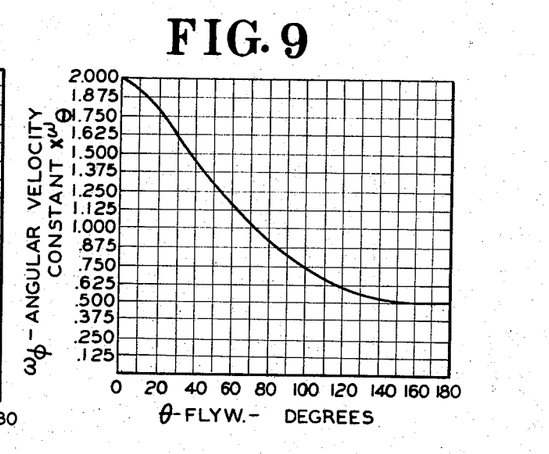
FIG. 9 shows a graph relation between degree turns of the flywheel and the angular velocity constant of the crank arm mounted in the flywheel.

In FIG. 6, the ratio $dc/ad = 1$, and according to line 67, col. 2 of my U.S. Pat. No. 3,658,001 the rocker arm 37 will have stopped its reciprocation and from FIG. 11 the angle $\theta = 70°\ 32'$ and the angular velocity of the rocker arm 37 is zero, and from FIG. 8 the crank angle $\theta$ is 109°28'.

FIG. 14 of the above mentioned patent shows an arrangement of planetary gearing comprising two circular gears of equal size and two elliptical gears having a maximum speed ratio = 2.00 and a reciprocal minimum ratio of 0.500 mounted on a driving arm or flywheel.

The center of rotation of the driving arm P is located at one focus of the stationary ellipse A and the mating elliptic gear B is compounded with circular gear C, having its center of rotation coincident with one of the foci of elliptic gear B and they are mounted on the arm P.

The output member is the circular gear D which meshes with the circular gear C and its center of rotation coincides with that of the input arm P.

Since the output speed varies from greater to less than the input speed there must occur during the rotation a position of the elliptic gears where unity speed is attained. Unfortunately, the tooth pressure becomes theoretically infinitely large at this point.

To overcome this excessive tooth pressure a pin each is secured at each still available focus of the elliptic gears A an B and then these two pins are connected by a link 30, as illustrated.

The addition of link 30 results in a crossed four-bar linkage which is mechanically equivalent to the elliptic gears and hence these gears could be dispensed with. However, a crossed four-bar linkage does not constitute a self-closing chain, therefore, a segment of the elliptic gear or a segment of an approximate circular gear may be used to assist passage thru the dead center position. These segments 19 and 20, 28 and 29 are respectively integral with crank arms 21 and 27.

In this new cylinder arrangement a force applied to the rocker arm 37 produces a practically constant torque on gear 33 during its entire motion, whereas a force applied to a standard crankshaft produces a variable torque when turning and it becomes zero at dead center.

Figures 10, 11:
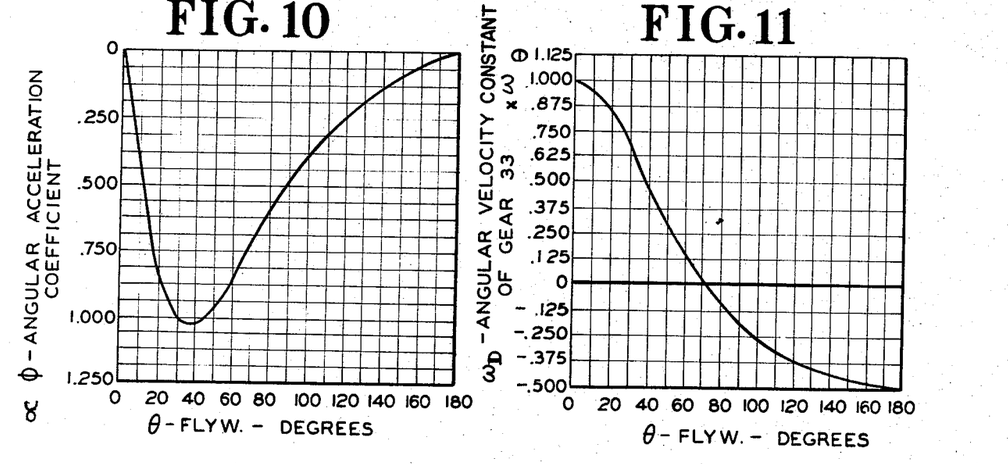
FIG. 10 shows a graph relation between turns of the flywheel and the angular acceleration constant of the crank arm and gear mounted in the flywheel.
FIG. 11 shows graphically the relation between degree turns of the flywheel and the angular velocity of the rocker arm.
Figure 12:
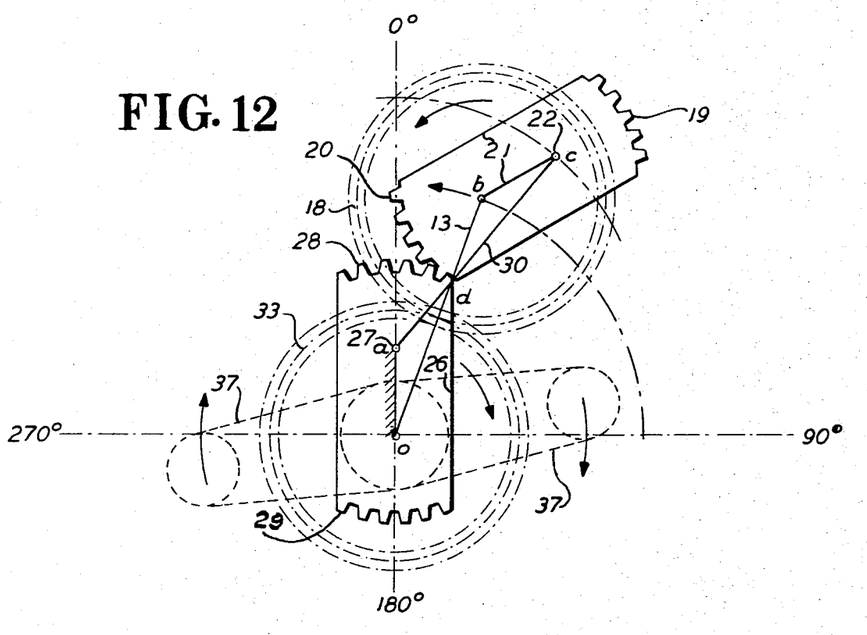
FIGS. 12 and 13 show alternate positions of crank arms 21 and 26.
Figure 13:
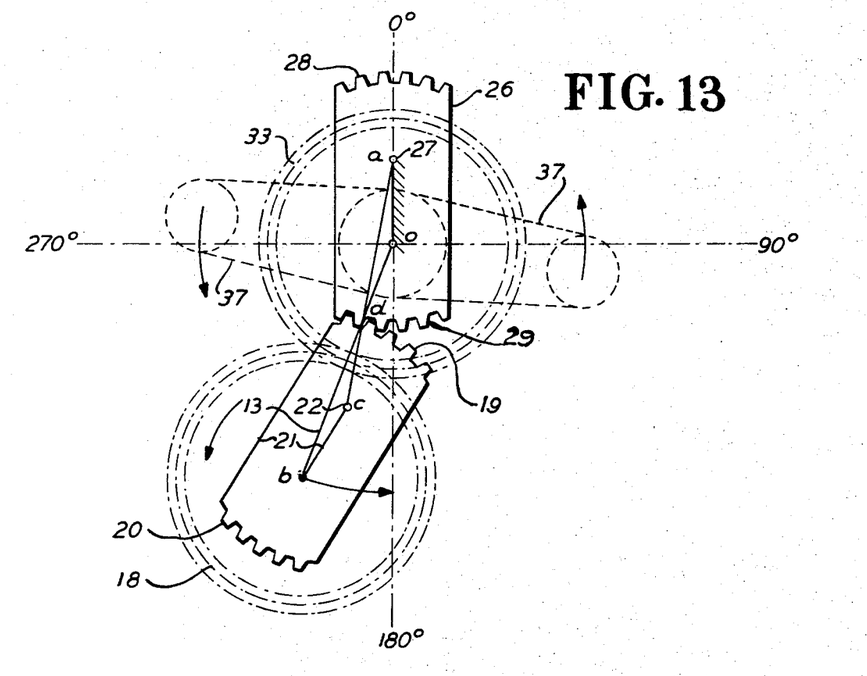

FIG. 11 shows the angular velocity constant of the gear 33. During the down-stroke of the rocker arm 37 its maximum angular velocity constant is unity, and it is equal to the constant angular velocity of the flywheel 13.

During the up-stroke of the rocker arm 37 its maximum angular velocity constant amounts to only ½ of that of the flywheel. However, the duration of the up-stroke lasts 11/18 part of a cycle, while the down-stroke lasts only 7/18 part of a cycle.

From the graph shown on FIG. 11, during the down-stroke the angular velocity constant average is 0.525 and during the up-stroke the velocity constant average is 0.333.

The amount of work done should be the same for the down-stroke as well as the up-stroke.

$$P \times S = P \times v \times t = R \times t \times \omega_D \times P$$

$P$ is the mean effective pressure in the cylinder,
$S$ is the piston stroke, inches,
$v$ is the linear velocity of the piston, inches per second,
$R$ is the length of the rocking arm 37, inches,
$\omega_{D\ av.}$ is the average angular velocity constant of rocker arm 37,
$t$ is the portion of the time consumed in a stroke,
$t$ is 7/18 for the down-stroke and 11/18 for the up-stroke.

Work done on down-stroke: $P \times R \times 0.525 \times 7/18 = 0.204\ P\ R$
Work done on up-stroke: $P \times R \times 0.333 \times 11/18 = 0.204\ P\ R$ In FIG. 11, when $\theta$ is approximately 70° the angular velocity $\omega_D$, i.e. the angular velocity of gear 33 is zero and the rocker arm 37, which is integral with the gear 33, has come to a stop, see FIG. 6, and will now reverse its direction of rotation. The gear 18 will continue to turn in the same direction, even though gear 33 turns in the opposite direction during the next 109° 28' until the gear 33 attains an angular velocity equal to ½ that of the flywheel 13, and when $\theta = 289°\ 28'$, see FIG. 6, the rocker arm 37 will again come to a stop after having turned approximately 78°.

|     | Flywheel 13 | Trunnion gear 18 | Rocker arm 37 | Fixed crank 26 & shaft 23 |
| --- | --- | --- | --- | --- |
|     | + 70° 32'<br>0 | + 70° 32'<br>+ 109° 28' | + 70° 32'<br>− 109° 28' | + 70° 32'<br>− 70° 32' |
| (1) | + 70° 32'<br>+ 109° 28' | + 180°<br>+ 109° 28' | − 38° 56'<br>+ 109° 28' | 0<br>+ 109° 28' |
|     | 0 | + 70° 32' | − 70° 32' | − 109° 32' |
| (2) | + 109° 28' | + 180° | + 38° 56' | 0 |
|     |  |  | Add (1) and (2) |  |
| (3) | + 180° | + 360° | ± 38° 56' | 0  ½ cycle |
| (4) | + 360° | + 720° | ± 77°52' | 0  One cycle |
|     | 1 Rev. | 2 Rev. | One up and down | Stationary |

I claim:

1. A multiple cylinder engine comprising in combination:
   a. a frame having the cylinders arranged in a rectangle, and
   b. pistons in said cylinders for reciprocation therein,
   c. rods connecting said pistons in pairs to
   d. a rocker arm,
   e. a hollow flywheel journalled on bearings supported on said frame, f. a stationary shaft coaxial with said flywheel, one end of said shaft being supported on said frame and the other end being journalled on said flywheel, g. said rocker arm having a pinion integral therewith and being supported on bearings held on said stationary shaft, said pinion rotating inside said hollow flywheel, h. a trunnion gear rotatably mounted eccentric to said shaft on bearings supported by said flywheel, and meshing with said pinion connected to said rocker arm, said trunnion gear and said pinion being the same size, i. cranks with crank pins, one each being mounted on said stationary shaft and said trunnion gear, the crank throw being ⅓ of the center distance between said trunnion gear and said pinion, and j. a link connecting the pins on said cranks, whereby the flywheel makes one revolution for each up and down motion of the rocking arm.

2. A multiple cylinder engine and flywheel comprising in combination:

a. a frame having cylinders arranged in a rectangle, and b. pistons in said cylinders for reciprocation therein, c. rods connecting said pistons in pairs to d. a rocker arm, e. a hollow flywheel journalled on bearings supported on said frame, f. a stationary shaft coaxial with said flywheel, one end of said shaft being supported on said frame and the other end being journalled on said flywheel, g. said rocker arm having a pinion integral therewith and being supported on bearings held on said stationary shaft, said pinion rotating inside said hollow flywheel, h. a trunnion gear rotatably mounted eccentric to said shaft on bearings supported by said flywheel, and mating with said pinion connected to said rocker arm, said trunnion gear and said pinion being the same size, i. cranks with crank pins, one each being mounted on said stationary shaft and said trunnion gear, j. a link connecting the pins on said cranks, whereby the crank mounted on the stationary shaft and the crank mounted on said pinion which is mounted on the flywheel form a crossed four-bar linkage.

3. In a multiple cylinder engine and flywheel as set forth in claim 2, having in addition two diametrically opposed gear segments integral with each crank and mating with each other when the crank mounted on the trunnion gear approaches the in-line position with said stationary crank, whereby assuring passage thru the dead center positions of the crossed four-bar linkage.

4. In a multiple cylinder-piston engine and flywheel as set forth in claim 2, having in addition two diametrically opposed elliptic gear segments integral with each crank and mating with each other when the crank mounted on the trunnion gear approaches the in-line position of the stationary crank, whereby the linkage becomes selfclosing for starting the engine.

5. In a multiple cylinder-piston engine and flywheel, as set forth in claim 2, having in addition two diametrically opposed gear segments, being circular approximations of elliptic gears, said segments being integral with each crank and mating with each other when the crank mounted on the trunnion gear approaches the in-line position of the stationary crank, whereby the crossed four-bar linkage becomes a self-closing chain.

6. In a multiple cylinder-piston engine and flywheel as set forth in claim 2, having in addition an adjustable arm connected to said stationary shaft, whereby said stationary shaft may be turned to vary the piston clearance between opposing pairs of pistons.

* * * * *